US011520317B2

(12) United States Patent
Tremblay et al.

(10) Patent No.: US 11,520,317 B2
(45) Date of Patent: Dec. 6, 2022

(54) AUDIO-BASED INDUSTRIAL AUTOMATION CONTROL

(71) Applicant: Rockwell Automation Technologies, Inc., Mayfield Heights, OH (US)

(72) Inventors: Natalie A. Tremblay, Racine, WI (US); Kristopher J. Holley, Mequon, WI (US); Louisa A. Wood, Bayside, WI (US); Thong T. Nguyen, New Berlin, WI (US); Paul D. Schmirler, Glendale, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 17 days.

(21) Appl. No.: 17/168,805

(22) Filed: Feb. 5, 2021

(65) Prior Publication Data

US 2022/0253044 A1 Aug. 11, 2022

(51) Int. Cl.
*G05B 19/418* (2006.01)

(52) U.S. Cl.
CPC ..... *G05B 19/4185* (2013.01); *G05B 19/4183* (2013.01); *G05B 19/41865* (2013.01)

(58) Field of Classification Search
CPC ............ G05B 19/4185; G05B 19/4183; G05B 19/41865
See application file for complete search history.

(56) References Cited

U.S. PATENT DOCUMENTS

| 5,987,105 A * | 11/1999 | Jenkins ................ G08B 25/007 379/106.01 |
| 8,458,665 B2 | 6/2013 | Bates et al. |
| 10,403,118 B2 | 9/2019 | Schulz et al. |
| 2004/0133719 A1* | 7/2004 | Howard ............... H04M 11/002 710/74 |
| 2005/0028034 A1* | 2/2005 | Gantman ............... H04H 20/12 714/E11.023 |
| 2008/0036619 A1* | 2/2008 | Rhodes ............... G06F 13/4278 340/4.32 |
| 2011/0074589 A1* | 3/2011 | Han ..................... H04L 12/2825 340/603 |
| 2013/0067940 A1* | 3/2013 | Shim .................. H04L 12/2825 62/125 |
| 2015/0063575 A1 | 3/2015 | Tan |

FOREIGN PATENT DOCUMENTS

JP 2008167204 A 7/2008

* cited by examiner

*Primary Examiner* — Christopher E. Everett
(74) *Attorney, Agent, or Firm* — Fletcher Yoder, PC

(57) ABSTRACT

A system may include audio devices that output sound waves. The system also includes a control system having a processor. The control system may receive a first plurality of operation parameters associated with a plurality of components in an industrial automation system from one or more sensors. The control system may also determine a plurality of audio tones based on the plurality of operation parameters. Further still, the control system may send one or more control signals to one or more audio devices in response to detecting the plurality of operation parameters, wherein the one or more audio devices are configured to produce the plurality of audio tones in response to receiving of the one or more control signals.

20 Claims, 4 Drawing Sheets

AUDIO-BASED INDUSTRIAL AUTOMATION CONTROL

BACKGROUND

The disclosure relates generally to systems and methods for controlling devices within an industrial automation system. More particularly, embodiments of the present disclosure are related to systems and methods for monitoring and controlling devices in the industrial automation system based on audio detected within the industrial automation system to improve robustness, reliability, and accuracy of operations within industrial environment.

Industrial automation systems are managed and operated using automation control and monitoring systems, particularly in industrial automation environments. Such applications may include the powering of a wide range of actuators, such as valves, electric motors, and so forth, and the collection of data via sensors. Some automation control and monitoring systems may include one or more components, such as programming terminals, automation controllers, input/output (I/O) modules, communication networks, human-machine interface (HMI) terminals, and the like.

Generally, certain precautions are taken to ensure that devices in industrial automation systems are operated as desired. However, some industrial automation systems are limited in monitoring and controlling its devices using data acquired via the automation control and monitoring systems described above. Although these automation control and monitoring systems may be used to manage the operations of the devices within the industrial automation system, improved systems and methods for operating devices within an industrial automation system are desirable.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to a system. The system includes one or more audio devices configured to output sound waves. The system also includes a control system comprising a processor. The control system may receive a first plurality of operation parameters associated with a plurality of components in an industrial automation system from one or more sensors. The control system may also determine a plurality of audio tones based on the plurality of operation parameters. Further still, the control system may send one or more control signals to one or more audio devices in response to detecting the plurality of operation parameters, wherein the one or more audio devices are configured to produce the plurality of audio tones in response to receiving of the one or more control signals.

In another embodiment, the present disclosure relates to a method. The method includes receiving, via a processor, a plurality of audio tones associated with a plurality of operations of one or more components in an industrial system. The method also includes detecting, via the processor, a discrepancy between the plurality of audio tones and a melody associated with the plurality of operations of the one or more components in the industrial system. Further, the method includes identifying, via the processor, an operation of the plurality of operations based the discrepancy. Further still, the method includes outputting, via the processor, a control signal to adjust one or more operations of the one or more components based on the operation of the plurality of operations.

In yet another embodiment, the present disclosure relates to a non-transitory computer-readable medium comprising computer-executable instructions. The instructions, when executed by at least one processor, cause the at least one processor to receive a plurality of audio tones associated with a plurality of operations of one or more components in an industrial system. The instructions also cause the processor to detect a discrepancy between the plurality of audio tones and a melody associated with the plurality of operations of the one or more components in the industrial system. Further, the instructions cause the processor to identify at least one component of the one or more components that corresponds to the discrepancy. Further still, the instructions cause the processor to transmit a notification to a computing device indicative of a possible error in the component.

DRAWINGS

These and other features, aspects, and advantages of the present disclosure will become better understood when the following detailed description is read with reference to the accompanying drawings in which like characters represent like parts throughout the drawings, wherein.

Figure 1:
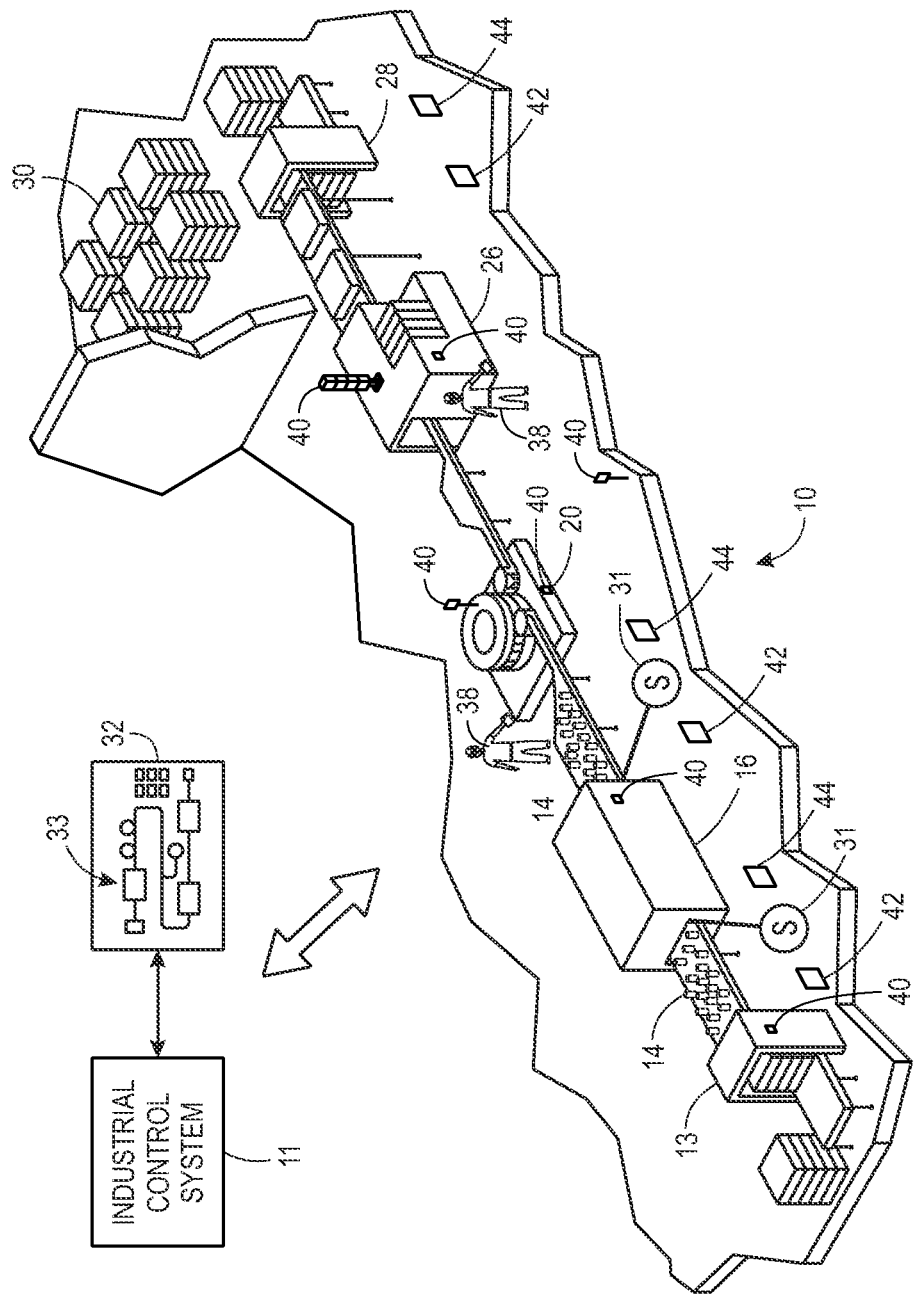
FIG. 1 is a perspective view of an example industrial automation system, in accordance with an embodiment.
Figure 2:
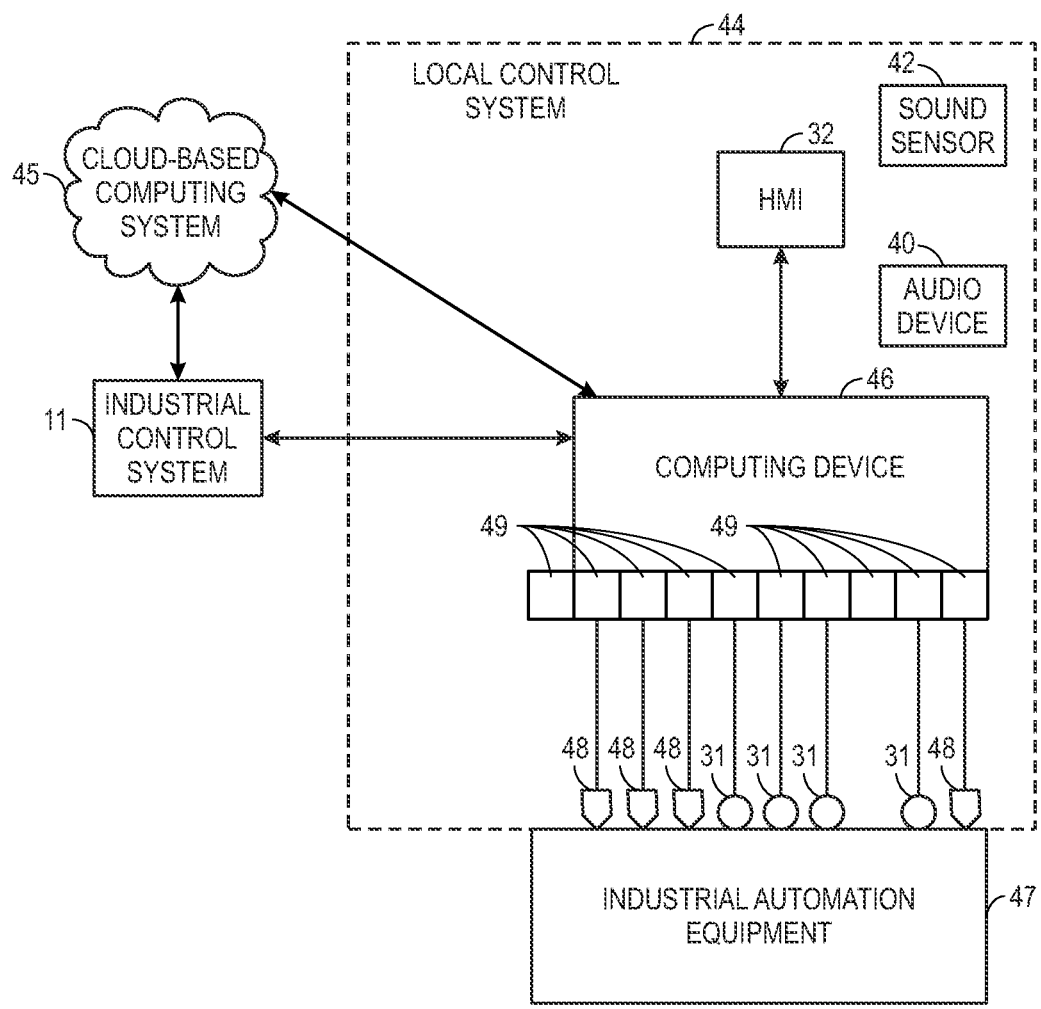
FIG. 2 is a diagrammatical representation of an exemplary local control system, in accordance with an embodiment.
Figure 4:
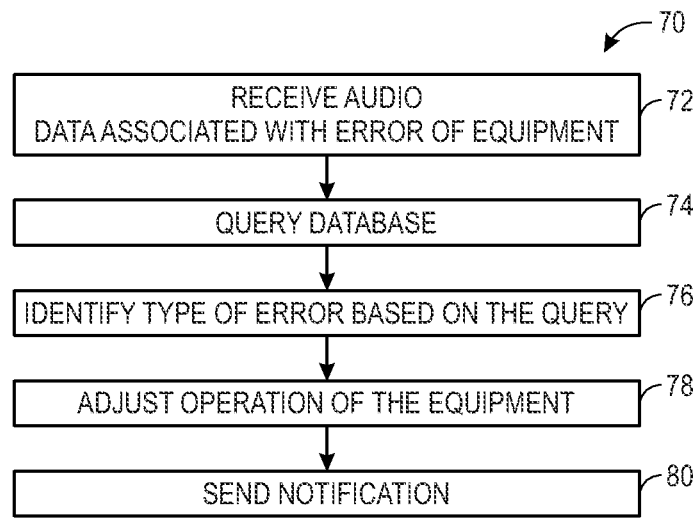
Figure 5:
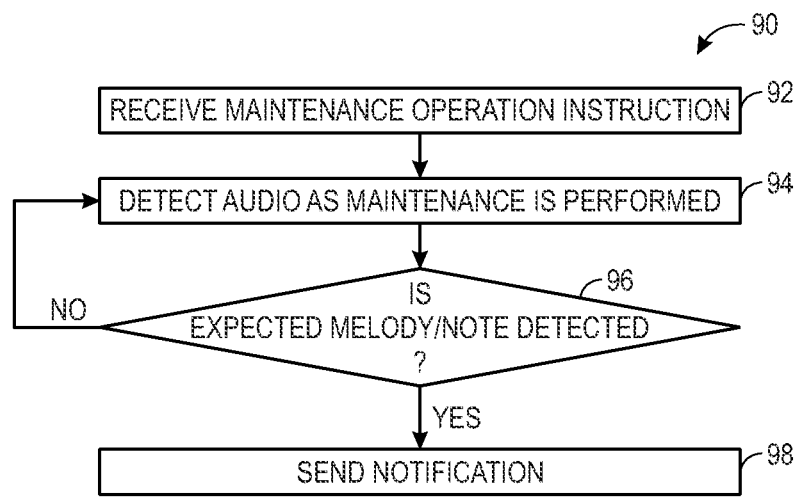

FIG. 4 is a flowchart of a method for controlling operation of industrial automation equipment within the industrial automation system of FIG. 1 using the local control system of FIG. 2 based on received audio data, in accordance with an embodiment; and FIG. 5 is a flow chart of a method of monitoring maintenance on an industrial automation equipment within the industrial automation system of FIG. 1 using the local control system of FIG. 2 based on received audio data, in accordance with an embodiment.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is generally directed towards an industrial control system for an industrial automation system that generates audio tones and audio melodies (e.g., a combination of audio tones) for machines and equipment (e.g., industrial automation equipment) using measured operating parameters (e.g., power consumption data, temperature data, electrical data, control signals) of the machines and equipment to verify that certain operations are performed by machines and equipment or that the machines and equipment are operating according to expectations. As referred to herein, the audio tones and audio melodies are digital audio data that may be audibly distinct from ambient noise produced by a machine (e.g., machine noise), such that the audio tones and melodies are discernable by an ear of an individual near the machine or by an audio sensor device that may acquire audio data related to the operation of the machine. For example, the audio tones may be non-audible tones that are not discernable by an ear of the individual (i.e., one or more frequencies of the audio tones corresponding to a frequency range that does not overlap with a frequency range discernable by a human ear), but measureable by the audio sensor device. In any case, the audio tones and audio melodies described herein may include audio tones that are distinct from machine noise (e.g., a mechanical noise due to a contactor opening, a humming sound produced by a fan). In some embodiments, the operations may correspond to a mechanical operation, such as the opening or closing of a door, a contactor opening or closing, activating or deactivating a conveyor system, actuating an arm on a machine assembly system, and the like. Some operations may include the execution of certain software processes or applications utilized by a processor. For example, the industrial control system may generate the audio tones based on operations performed by multiple machines (e.g., executing software, outputting control signals to actuators) and each audio tone may be linked to a respective operation. Further, the industrial control system may cause an audio device to produce a sound corresponding to the generated audio tones in response to industrial automation equipment performing their respective operations. Each produced sound may correspond to an audio tone (e.g., a music note), such that the combination of the audio tones may produce a melody (e.g., an audio melody) based on a sequence of the operations performed by the machines.

As such, an individual or group of individuals located near the machines may confirm that each of the machines is operating as expected when the individual hears the audio melody. However, if one of the machines encounters an error or issue (e.g., does not perform an operation as expected), the corresponding audio device will not produce the audio tone that is linked to the performance of the machine. As such, the resulting series of audio tones will deviate from the expected audio melody of the machines due to the missing audio tone. Thus, a user or audio sensor may be able to identify the machine that is not operating as expected based on the missing audio tone. That is, the multiple sounds corresponding to the audio tones may provide the individual tasked with controlling or monitoring the industrial automation equipment an audible indication related to mechanical failures and/or software failures of the machines. As such, the individual located near the industrial automation equipment may determine that an error condition is present in the operation of the industrial automation equipment due to deviation in the audio melody. The individual may then initiate a corrective action to resolve the error, such as providing maintenance, stopping operation of the industrial automation equipment, and the like. In this way, the individual may avoid visually inspecting the industrial automation equipment or accessing software associated with the industrial automation equipment to identify and locate a problematic component (e.g., machine hardware or software) or verify that one or more components of the industrial automation equipment are operating as expected. Additional details with regard to employing audio tunes and melodies to coordinate operation and management of components in an industrial automation system will be discussed below with reference to FIGS. 1-5.

By way of introduction, FIG. 1 is a perspective view of an example industrial automation system 10 controlled by an industrial control system 11. The industrial automation system 10 includes stations having machine components and/or machines to conduct a particular function within an automated process, for example, a beverage packaging process, as is depicted. The automated process may begin at a station 13 used for loading objects, such as empty cans or bottles to be filled, into the industrial automation system 10 via a conveyor section 14. The conveyor section 14 may transport the objects to a station 16 to perform a first action, for example, washing the empty cans and/or bottles. As objects exit from the station 16, the conveyor section 14 may transport the objects to a station 20, such as a filling and sealing station, in a single-file line. A second conveyor section 14 may transport objects from the station 20 to a station 26. After the objects proceed through the various stations, the objects may be removed from the station 28, for example, for storage in a warehouse 30. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, a mechanized assembly line, and so forth. Accordingly, the industrial automation system 10 may comprise a variety of operating components, such as electric motors, valves, actuators, temperature elements, pressure sensors, or a myriad of machinery or devices used for manufacturing, processing, material handling, and other applications.

Additionally, the industrial automation system 10 may include various types of equipment that may perform the various operations that may be part of an industrial application. For instance, industrial automation system 10 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Further, the equipment may include software components and/or hardware components. Moreover, the methods described herein may be applied to both software components and hardware components.

In certain embodiments, one or more properties of the industrial automation equipment, such as the station 16, may be monitored and controlled by an industrial control system 11 for regulating control variables. For example, sensing devices (e.g., sensors 31) may monitor various operating parameters (e.g., properties) of the industrial automation system 10 and may be used in adjusting operations of the industrial automation system 10. In some cases, the industrial automation system 10 may be associated with devices used by other equipment. For instance, scanners, gauges, valves, flow meters, and the like may be disposed on the industrial automation system 10. Here, the industrial control system 11 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control system 11 may be communicatively coupled to a display/operator interface 32 (e.g., an HMI) and to devices of the industrial automation system 10. Although one industrial control system 11 is depicted, it should be understood that any suitable number of industrial control systems 11 may be used in a particular industrial automation system 10 embodiment. The industrial control system 11 may facilitate representing components of the industrial automation system 10 through programming objects that may be instantiated and executed to provide simulated functionality similar or identical to the actual components, as well as visualization of the components, or both, on the display/operator interface 32. The programming objects may include code and/or instructions stored in the industrial control system 11 and executed by processing circuitry of the industrial control system 11. The processing circuitry may communicate with memory circuitry to permit the storage of the component visualizations.

As illustrated, the display/operator interface 32 depicts representations 33 of the components of the industrial automation system 10. The industrial control system 11 may use data transmitted by sensors 31 to update visualizations of the components via changing one or more statuses, states, and/or indications of current operations of the components. These sensors 31 may be any device adapted to provide information regarding process conditions (e.g., the operating parameters). Indeed, the sensors 31 may be used in a process loop that are monitored and controlled by the industrial control system 11. As such, a process loop may be activated based on process inputs (e.g., an input from the sensor 31) or direct input from an individual 38 via the display/operator interface 32. The individual 38 operating and/or monitoring the industrial automation system 10 may reference the display/operator interface 32 to determine various statuses, state, and/or current operations of the industrial automation system 10 and/or for a particular component. Furthermore, the individual operating and/or monitoring the industrial automation system 10 may adjust to various components to start, stop, power-down, power-on, or otherwise adjust an operation of one or more components of the industrial automation system 10 through interactions with control panels or various input devices.

An individual 38 monitoring and controlling operation of the industrial automation system 10 may find controlling or monitoring difficult if he/she walk away or are otherwise located away from the display/operator interface 32 or from a respective control panel. Thus, an audio device 40 may assist the individual 38 in remotely monitoring components of the industrial automation system 10 (e.g., while located away from the display/operator interface 32) by producing audio tones and audio melodies that may indicate a success or failure of operations performed by the equipment of the industrial automation system 10. For example, the audio device 40 may be configured to produce a sound corresponding to an audio melody when the stations 13, 20, 26, and 28 or components within the stations perform their respective operations. As discussed in more detail herein, a local control system 44 may associate a particular sound or note to each machine of the industrial automation equipment 10 to facilitate identification of the machine and the location of the machine. That is, continuing with the example above, an audio device 40 may produce a first sound corresponding to first audio tone when the first operation (e.g., washing bottles) is performed at station 16. Subsequently, the audio device 40 may produce a second sound corresponding to a second audio tone when a second operation (e.g., filling and sealing of the bottles) is performed at station 20. Accordingly, the sounds (e.g., the first sound and second sound) corresponding to the audio tones (e.g., the first audio tone and the second audio tone) may inform the individual 38 of the stations, as well as the particular machines or equipment, that are operating as expected. Additionally or alternatively, the machine noise produced by the equipment of the industrial automation system 10 may be used to indicate a success or failure of operations performed by the equipment.

Additionally, the industrial automation system 10 may include audio sensors 42 (e.g., microphones) that may receive the audio data corresponding to the sounds produced by the audio device(s) 40. to enable data transfer. Such networks permit the exchange of data in accordance with a predefined protocol, and may provide power for operation of networked elements. Although not depicted in FIG. 1, the computing device 46 may also include controllers, input/output (I/O) modules, motor control centers, operator interfaces, contactors, starters, drives, relays, network switches (e.g., Ethernet switches, modular-managed, fixed-managed, service-router, industrial, unmanaged, etc.), and the like.

The industrial automation equipment 47 may take many forms and include devices for accomplishing many different and varied purposes. For example, the industrial automation equipment 47 may include machinery used to perform various operations in a compressor station, an oil refinery, a batch operation for making food items, a mechanized assembly line, and so forth. Accordingly, the industrial automation equipment 47 may comprise a variety of operating components, such as electric motors, valves, actuators, temperature elements, pressure sensors, or a myriad of machinery or devices used for manufacturing, processing, material handling and other applications. At least in some instances, the industrial automation equipment 47 may include the audio device 40 or another suitable audio-producing device to produce the audio tones described herein.

Additionally, the industrial automation equipment 47 may include various types of equipment that may be used to perform the various operations that may be part of an industrial application. For instance, the industrial automation equipment 47 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 47 may also include motors, protection devices, switchgear, compressors, and the like. Further, the industrial automation equipment 47 may include components to perform the various operations. The components of the industrial automation equipment 47 may include software components and/or hardware components. Moreover, the methods described herein may be applied to both software components and hardware components.

As discussed above with respect to FIG. 1, one or more properties of the industrial automation equipment 47 may be monitored and controlled by certain equipment for regulating control variables. For example, sensors 31 and actuators 48 may monitor various properties of the industrial automation equipment 47 and may be involved to adjust operations of the industrial automation equipment 47, respectively.

In some cases, the industrial automation equipment 47 may be associated with devices used by other equipment. For instance, scanners, gauges, valves, flow meters, and the like may be disposed on industrial automation equipment 47. Here, the industrial automation equipment 47 may receive data from the associated devices and use the data to perform their respective operations more efficiently. For example, a controller (e.g., the computing device 46) of a motor drive may receive data regarding a temperature of a connected motor and may adjust operations of the motor drive based on the data.

In certain embodiments, the industrial automation equipment 47 may include a computing device and/or a communication component that enables the industrial automation equipment 47 to communicate data between each other and other devices. The communication component may include a network interface that may enable the industrial automation equipment 47 to communicate via various protocols such as EtherNet/IP, ControlNet, DeviceNet, or any other industrial communication network protocol. Alternatively, the communication component may enable the industrial automation equipment 47 to communicate via various wired or wireless communication protocols, such as Wi-Fi, mobile telecommunications technology (e.g., 2G, 3G, 4G, LTE), Bluetooth®, near-field communications technology, and the like.

The sensors 31 may be any number of devices adapted to provide information regarding process conditions. The actuators 48 may include any number of devices adapted to perform a mechanical action in response to a signal from a controller (e.g., the computing device 46). The sensors 31 and actuators 48 may be utilized to operate the industrial automation equipment 47. Indeed, they may be utilized within process loops that are monitored and controlled by the computing device 46 and/or the HMI 32. Such a process loop may be activated based on process inputs (e.g., input from a sensor 31) or direct operator input received through the HMI 32. As illustrated, the sensors 31 and actuators 48 are in communication with the computing device 46. Further, the sensors 31 and actuators 48 may be assigned a particular address in the computing device 46 and receive power from the computing device 46 or attached modules.

Input/output (I/O) modules 49 may be added or removed from the local control system 44 via expansion slots, bays or other suitable mechanisms. In certain embodiments, the I/O modules 49 may be included to add functionality to the computing device 46, or to accommodate additional process features. For instance, the I/O modules 49 may communicate with new sensors 31 or actuators 48 added to monitor and control the industrial automation equipment 47. It should be noted that the I/O modules 49 may communicate directly to sensors 31 or actuators 48 through hardwired connections or may communicate through wired or wireless sensor networks, such as Hart or IOLink.

Generally, the I/O modules 49 serve as an electrical interface to the computing device 46 and may be located proximate or remote from the computing device 46, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 49 may transfer input and output signals between the computing device 46 and the industrial automation equipment 47. As illustrated, the sensors 31 and actuators 48 may communicate with the computing device 46 via one or more of the I/O modules 49 coupled to the computing device 46.

In certain embodiments, the local control system 44 may be communicatively coupled to the industrial control system 11 via a cloud-based computing system 45. In this network, input and output signals generated from the computing device 46 may be communicated between the industrial control system 11 and the cloud-based computing system 45. However, in some embodiments, the input and output signals generated from the computing device 46 may be directly communicated to the industrial control system 11. That is, while the illustrated embodiment of FIG. 2 shows a cloud-based computing system 45, it should be noted that in some embodiments the cloud-based computing system 45 may be omitted.

Figure 3:
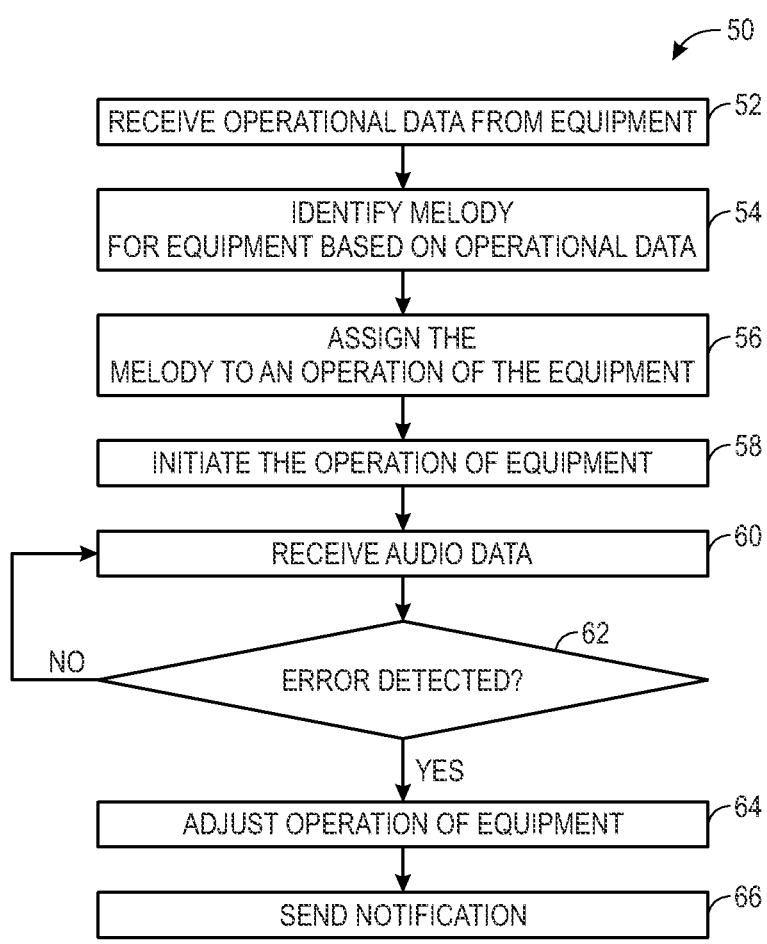
FIG. 3 is a flowchart of a method for controlling operation of industrial automation equipment within the industrial automation system of FIG. 1 using the local control system of FIG. 2, in accordance with an embodiment.

Referring now to FIG. 3, FIG. 3 is a flowchart of a method 50 for identifying an audio tone or audio melody to assign to the industrial automation equipment 47 and adjusting operation of the industrial automation equipment 47 based on an error that is detected using the audio tone(s). Although the method 50 is described below as performed by the local control system 44, it should be noted that the method 50 may be performed by any suitable processor to perform automation commands based on detected audio data, such as the industrial control system 11. Although described in a particular order, which represents a particular embodiment, it should be noted that the process 50 may be performed in any suitable order. Additionally, embodiments of the process 50 may omit process blocks and/or include additional process blocks.

At block 52, the local control system 44 may receive, collect, or monitor operating parameters acquired by the sensors 31 that are associated with the industrial automation equipment 47 to determine operating parameters that indicate operations performed by the industrial automation equipment 47. The operating parameters may include electrical usage data, temperature data, audio data, and other data that may be linked to operations performed by the industrial automation equipment 47. In some embodiments, receiving the operating parameters may include determining a number and a relative ordering of operations performed by the industrial automation equipment. The order of operations may be used to identify an audio tone to assign to each operation to produce an audio melody, as discussed in more detail at block 54. For example, a change in power consumption data for multiple machines at different times may indicate a relative order of operation of the machines. Moreover, by using an audio tone that is distinct from the machine noise produced by the machines, it may be easier for the local control system 44, for example, to determine whether the industrial automation equipment are operating as expected.

In some embodiments, to receive the operating parameters from the sensors 31, the local control system 44 may output a control signal that causes the sensors to acquire the operating parameter data. For example, the local control system 44 may output a control signal to an electrical sensor, causing the electrical sensor to acquire electrical data indicative of when the industrial automation equipment is performing an action. As another non-limiting example, the local control system 44 may output a control signal that causes an audio device 40 to activate. The audio device 40 may record machine noise and/or an audio tones produced by the industrial automation equipment 47 during operation. In any case, after receiving the operating parameter, the local control system 44 may proceed to block 54 to identify one or more tones to associate with the corresponding operation of the respective industrial automation components.

Referring again to block 54, the local control system 44 may identify one or more audio tones to associate with the industrial automation equipment 47 based on the operation data. In general, identifying the one or more tones may be based on the number of industrial automation components (e.g., hardware components and software components) that are operating within the industrial automation system 10 and the order of operation of the industrial automation components.

For example, the local control system 44 may determine a relative order of operation of three machines, or three components of the industrial automation equipment 47, based on the received operation parameters (e.g., block 52). As such, at block 54, the local control system 44 may identify three tones (e.g., three music notes) to form an audio melody. Then, the local control system 44 may proceed to block 56 to assign the audio melody to the operation of the three machines (e.g., or the components of the industrial automation equipment 47) such that a sound corresponding to each audio tone is produced by the audio device 40 and/or the industrial automation equipment when the corresponding machine performs one operation. At least in some instances, the industrial automation equipment 47 may include an audio device capable of producing a sound, and as such the industrial automation equipment 47 be assigned the audio tone and produce the audio tone with a suitable audio device other than the audio device 40. In general, the audio tones may be linked to operations performed by components, equipment, machines, or stations (e.g., a grouping of multiple components, equipment, or machines). As another non-limiting example, the local control system 44 may identify multiple machines within a station (e.g., station 16, 20, and 28 as discussed above with respect to FIG. 1). Using a timestamp associated with certain operating parameters measured by the sensors 31 for each machine of the stations 16, 20, 28, the local control system 44 may identify that the station 16 performs an operation before the station 20, and that the station 20 performs and operation before the station 28. Accordingly, the local control system 44 may identify three audio tones and proceed to block 56 to link an audio tone of the three audio tones to the stations 16, 20, and 28, based on the order that the stations 16, 20, and 28 perform their respective operations. Although the example provided above refers to certain industrial automation equipment 47, stations, or components, and the order in which they perform certain operations, it should be noted that the embodiments described herein may be implemented based on operations of any suitable device, such as hardware and software components that may be part of the industrial automation system 10.

In some embodiments, the local control system 44 may analyze the operations of the industrial automation components with respect to audio data profiles, such that each audio data profile includes a melody and audio tones (e.g., musical notes) associated with each melody. The local control system 44 may assign each of tone of the multiple tones to an operation performed by the industrial automation equipment 47. For example, a memory accessible by the computing device 46 may store audio data corresponding to a known melody, such as a predetermined melody corresponding to a song. As such, the local control system 44, when identifying a melody at block 54 for the operation of various industrial automation components, may utilize the tones (e.g., music notes) of the stored audio data. That is, the local control system 44 may identify a relative order of the operations and a number of operation performed by the industrial automation components and identify a stored audio data profiles that corresponds to the number of operations performed by the industrial automation components.

Returning to block 56, the local control system 44 may assign, link, or associate the audio tone or audio melody identified at block 54 to operations (e.g., actions) of the industrial automation components, industrial automation equipment 47, stations (e.g., stations 16, 18, and 20 as discussed above regarding FIG. 1), and/or machines. In general, the local control system 44 may link different audio tones of a melody to different operations of different industrial automation components based on the order, speed, cadence, and of the operations. For example, to link an audio tone to an operation, the local control system 44 may include outputting a control signal to the audio device 40 that causes the audio device 40 to produce the audio tone associated each operation in response to the industrial automation equipment 47 performing the operation. As discussed herein, the audio device 40 may be integrated, inside, or otherwise a part of the industrial automation equipment 47. At least in some instances, having an audio device 40 inside or integrated with the industrial automation equipment 47 may facilitate locating the industrial automation equipment 47. For example, a series of machines may each be assigned an audio tone. As such, when each of the machines are operating as expected (e.g., performs their respective action), the audio device 40 will produce a sound corresponding to each audio tone, forming the audio melody. Accordingly, and as discussed in more detail with respect to block 62, the melody may indicate that each of the machines are operating as expected.

As discussed above, at block 54, the local control system 44 may identify a relative order of the operations and a number of operations performed by the industrial automation components and identify a stored audio data profile that includes a number of audio tones that corresponds to the number of operations performed by the industrial automation components. As such, linking the stored audio data to the industrial automation components may cause an audio device 40 to play series of tones that are each linked to an action or operation performed by the industrial automation components. In an embodiment where multiple industrial automation components are each capable of producing a respective audio tone, the series of audio tones produced by each industrial automation component (i.e., using an audio device that is part of the industrial automation equipment) may produce the series of tones linked to the actions or operations performed by the industrial automation components. Accordingly, when the industrial automation components performs the operations, a recognizable melody may be produced by one or more audio devices 40. However, if one of the operations is not performed, one or more of the tones may be missing, and thus an operator or the audio sensors 42 may identify an error in the operation of the industrial automation components corresponding to the linked to the missing tones. In this way, producing the tones linked to the operations performed by the industrial automation components may facilitate the detection of errors in the operation of the industrial automation components, and as described in more detail below.

In some embodiments, the local control system 44 may link an audio operation tone having certain sound characteristics (e.g., volume, pitch, frequency) to operations performed by the industrial automation component based on the operation parameters measured by the sensors 31 of the industrial automation equipment 47. For example, the local control system 44 may assign a first tone associated with a speed of a conveyor belt corresponding to a normal operating speed of the conveyor belt. As such, when the conveyor belt is operating at the normal operating speed, the local control system 44 may output a control signal that causes an audio device 40 to emit the sound. Accordingly, the sound produced by the audio device 40 indicates that the conveyor is operating at a normal operating speed. Conversely, if the conveyor belt is not operating at the normal operating speed, then the audio device 40 may not emit the sound and may emit a different sound that indicates that the conveyor is not operating at the normal operating speed. In some embodiments, the local control system 44 may assign different sound characteristics to different operational parameters of industrial automation equipment 47. For example, the local control system 44 may assign a plurality of frequencies within a frequency range to different operating speeds of the conveyor belt. As such, a change (e.g., increase or decrease) in the frequency of the sound emitted by the audio device 40 corresponds to a change in the operating speed of the conveyor belt. That is, an increase in the frequency of the sound may correspond to an increase in the operating speed of the conveyor belt.

In some embodiments, the local control system 44 may link an operational tone corresponding to a different musical instrument to each industrial automation component and/or operation performed by the industrial automation components. In this way, an individual may determine that one or more industrial automation components are not operating as expected based on a discrepancy in the sound emitted by the audio device 40 corresponding to, for example, a missing sound produced by an instrument. It should be noted that linking different musical instruments to different industrial automation components may facilitate identification of industrial automation components that are not operating as expected, as well as a generally location where industrial automation components are not operating as expected.

In any case, after linking the audio tone or melody to the operations performed by the industrial automation components, the process 50 may proceed to block 58. At block 58, the local control system 44 may initiate operation of the industrial automation equipment 47 or industrial automation components. For example, the local control system 44 may output a control signal to one or more industrial automation equipment 47, causing the industrial automation equipment 47 to operate and the local control system 44 may monitor operation parameters acquired by the sensors 31.

At least in some instances, the local control system 44 may assign an audio operational tone without using measured operational parameters of the industrial automation equipment 47. For example, the local control system 44 may identify the industrial automation equipment 47 operating within the industrial automation system 10 and assign each equipment an audio operational tone that may include a sound characteristic or sound corresponding to a musical instrument that is unique and facilitates determining whether the industrial automation equipment 47 are operating as expected. In some embodiments, the local control system 44 may receive the audio operational tone as an input from a user.

At block 60, the local control system 44 may receive audio data produced by the audio device 40 using the audio sensor 42. In some embodiments, the local control system 44 may send suitable signals (e.g., control signals) to instruct the audio sensors 42 to acquire the audio data. As such, when the audio devices 40 are producing sounds corresponding to the audio tones and melodies, the audio data will include the audio tones and melodies. At least in some instances, the local control system 44 may receive the machine noise and utilize the machine noise to determine whether the industrial automation equipment 47 are operating as expected. For example, the local control system 44 may filter a frequency range corresponding to each of the machine noise and the audio data produced by the audio device 40. At least in some instances, the machine noise may be used to supplement a determination of an error in the operation of the industrial automation equipment (i.e., due to a discrepancy in the machine noise). In this way, the local control system 44 may utilize both machine noise audio data and audio data produced by the audio device 40.

In some embodiments, the local control system 44 may store the audio data (e.g., digitized data from analog input) in a memory accessible by the local control system 44. In addition, the audio device 40 may filter, pre-process, or prepare the received audio data prior to interpretation to improve interpretability of the received audio data. In other words, the audio device 40 may reduce noise components of the received audio data. The audio device 40 may filter received audio data, for example, by using Fast Fourier transform (FFT) filtering techniques to separate the received audio data into its frequency components and discard the frequency components corresponding to background noise of the industrial automation system 10, however, the audio device 40 may use a variety of noise filtering techniques to improve interpretability of the received audio data. For example, the audio device 40 may use the FFT filtering techniques, learning algorithms to learn normal or expected operating noises of the industrial automation system 10 (and thus may ignore the audio data that is expected), neural net filtering techniques, and the like.

At block 62, the local control system 44 may determine whether there is an error in the operation of the industrial automation component using the received audio data. In general, the local control system 44 may detect for missing tones, tones with a different in pitch, an incorrect melody, and other irregular sounds produced by the audio device 40 that differ from the audio melody linked to the operation of the industrial automation component. For example, a missing tone linked to an industrial automation component In some embodiments, the local control system 44 may compare the received audio data to reference audio data (e.g., audio data linked to the industrial automation equipment that is stored in a memory of the local control system 44) to determine whether the audio data is associated with an error in the operation of the industrial automation equipment. For example, the local control system 44 may compare sound characteristics (e.g., volume, pitch, frequency, melody, rhythm, a time period between each note) of the received audio data to sound characteristics corresponding to reference audio data. As another non-limiting example, the sound characteristics may include a time period between each audio tone of the received audio data. As such, the local control system 44 determine that the received audio data does not match the melody when a time period between each adjacent audio tone of the audio tones of the received audio data is different than a reference time period corresponding to the reference audio data. When the sound characteristics of the audio data correlate to or match the sound characteristics of the reference audio data corresponding to the user or other authorized individuals, the local control system 44 may determine that the received audio data does not indicate an error in the operation of the industrial operation components and the local control system 44 may receive additional detected audio data to continue to monitor operation of the industrial automation components. However, if the local control system 44 determines that the received audio data does indicate an error in the operation of the industrial automation equipment, the process 50 may proceed to block 64 and adjust operation of the equipment. In some embodiments, the local control system 44 may output a notification (e.g., an alert or warning) to an operator that indicates that the industrial automation equipment is operating as expected. For example, the notification may be a pop-up notification displayed on a device associated with an individual (e.g., a smart phone, table, and laptop) that indicates the components that are not working as expected. In some embodiments, the notification may indicate a maintenance procedure to fix the component that is not working as expected.

At block 64, the local control system 44 may adjust an operation of the industrial automation equipment 47. In some embodiments, adjusting operation of the industrial automation equipment includes outputting a control signal that may cause the one or more components of the industrial automation equipment to enter a default automation state. The default automation command may be a safe state (e.g., power-off, slow down, change operation) command for a respective machine. In one embodiment, the default automation command may include continuing the operation of the respective machine control system 61 without adjusting any operations of the industrial automation system 10. In an embodiment where at least some of the components are software components, the control signal may cause a software file to revert to a previous version.

At block 66, the audio device 40 may send a notification requesting a manual confirmation of the automation command determined at block 146 or a notification indicating that the confidence level is low for the respective automation command. By determining whether to implement the recognized automation command based on the confidence value, the local control system 44 may be safeguarded or protected against interpreting random audio data as an automation command. By determining whether to implement the recognized automation command based on the confidence value, the audio device 40 may be safeguarded or protected against interpreting random audio data as an automation command. At least in some instances, the notification may be an alert or warning indicating that the industrial automation equipment 47 is not operating as expected. As discussed herein, the notification may be sent to one or more remote devices to facilitate remote monitoring of the industrial automation system 10. In some embodiments, the notification may be displayed on an HMI or an alert audio tone may be produced (e.g., by the audio device 40.)

As discussed above, it should be noted that the process 50 may be performed in any suitable order. Additionally, embodiments of the process 50 may omit process blocks and/or include additional process blocks. For example, in one embodiment, the process 50 may omit block 64. For example, after the local control system 44 determines there is an error in the operation of an industrial automation component, a machine, equipment, or a station (e.g., multiple machines, components, equipment), the process 50 may proceed to block 66 and send a notification. The notification may include diagnostic information, such as an identified error (e.g., error code, the specific equipment that is not operating as expected). Additionally or alternatively, the diagnostic information may include a confidence value that the identified error is likely the cause of the equipment, station, machine, and/or component not operating as expected. Accordingly, this may inform a user regarding certain decisions or actions to make based on the identified error. At least in some instances, the notification may include instructions for repairing the equipment, such by accessing instructions stored in a database or storage accessible by the local control system 44.

In some embodiments, the process 50 may perform block 66 before block 64. For example, the local control system 44 may output a notification to the user requesting the user confirm whether or not to adjust the operation of the industrial automation equipment 47. The notification may include a confidence value and/or diagnostic information associated with the industrial automation equipment that is not working as expected, such as a percentage or likelihood of the cause of an error and/or a likelihood that adjusting the operation will remedy the industrial automation equipment 47 that are not operating as expected. As such, if the user confirms the request provided in the notification, the process 50 may proceed to block 64 and the local control system 44 may adjust operation of the industrial automation equipment 47.

In some embodiments, the local control system 44 may adjust the operation of the industrial automation equipment 47 without receiving confirmation from a user (e.g., an operator). For example, after the local control system 44 determines there is an error in the operation of an industrial automation component, a machine, equipment, or a station (e.g., multiple machines, components, equipment), the process 60 may proceed to block 64 and adjust the operation of the industrial automation component, machine, equipment, or the station. In some embodiments, the local control system 44 may adjust the operation automatically after determining that the error is on an approved listed of errors that the local control system 44 may correct (e.g., by adjusting the operation of the equipment). In some embodiments, the local control system 44 may adjust the operation automatically if a determine confidence value is above a threshold (e.g., greater than 50%, greater than 80%, greater than 90%, greater than 99%). Accordingly, at least in some instances, the local control system 44 may adjust the operation of the industrial automation equipment 47 automatically, which may reduce operational costs (e.g., having an operator repair the industrial automation equipment 47).

Accordingly, generating and outputting audio tones that may be distinct from machine noise produced by the industrial automation equipment 47 may facilitate identification of potential errors in the operation of the industrial automation equipment. That is, while at least in some instances, the machine noise may indicate whether a machine is operating as expected, the audio tones may be more readily identified by the local control system 44.

Referring now to FIG. 4, FIG. 4 is a flowchart of a method 70 for adjusting operation of the industrial automation system 10 based upon an error that is identified using a query. Although the method 70 is described below as performed by the local control system 44, it should be noted that the method 70 may be performed by any suitable processor to perform automation commands based on detected audio data. Moreover, although the following description of the method 70 is described in a particular order, it should be noted that the method 70 may be performed in any suitable order and with certain steps removed added and/or remove. Although described in a particular order, which represents a particular embodiment, it should be noted that the process 60 may be performed in any suitable order. Additionally, embodiments of the process 60 may omit process blocks and/or include additional process blocks.

At block 72, the local control system 44 may receive audio data associated with an error in the operation of the industrial automation components. As described herein, the audio data may be received by the audio sensor 42. In general, the audio data includes an audio tune or melody that is associated with operations performed by the industrial automation components of the industrial automation system 10. In some embodiments, the local control system 44 may receive the audio data in a similar manner as described in block 60 of the method 50 of FIG. 3. In some embodiments, the local control system 44 may receive the audio data as an input from a user. For example, an individual managing the industrial automation system 10 may, as part of scheduled maintenance, submit recorded audio data produced by an audio device to determine whether equipment is operating correctly.

Upon receiving the audio data at block 72, the local control system 44 may query a database for a reference audio data associated with the industrial automation components at block 74. In general, the reference audio data may include sound profiles corresponding to audio melodies of particular equipment. For example, the reference audio data may include an audio melody corresponding to the industrial automation components performing its associated operations as expected. In some embodiments, the reference audio data may include reference audio errors. In general, the reference audio errors may include one or more tones that indicate a specific error for the industrial automation equipment. For example, the database may store audio melody for a machine that performs four operations corresponding to the execution of four software subroutines. As such, the audio melody may include a series of four audio tones in a specific sequence. Additionally, the database may store a reference audio error that includes a specific combination of the audio tones that may be associated with a specific type of error.

In some embodiments, the local control system 44 may determine whether a portion of the received audio data corresponds to a particular machine or industrial automation components of the industrial automation system 10. For example, the audio data may correspond to sounds, produced by an audio device 40, having sound characteristics (e.g., tone, frequency, volume, rhythm) or other indicia associating with the sounds with a particular machine. Upon determining that the audio data corresponds to the machine, the process 70 may proceed to block 76 to identify an error associated with the machine. However, if the local control system 44 determines that the audio data does not correspond to a particular machine, the local control system 44 may proceed to block 52 of process 50 of FIG. 3 to assign an audio data to the equipment. In some embodiments, the local control system 44 may generate audio profiles for each of the industrial automation equipment 47 that may be used to identify the errors, and thereby enabling monitoring of multiple equipment performing different actions and in different locations.

At block 76, the processor may identify an error based on the query using the received audio data. In some embodiments, the local control system 44 may compare sound characteristics (e.g., tone, frequency, volume, rhythm) of the audio data to sound characteristics corresponding to reference audio tones of the machine (e.g., audio profiles), which may be provided by the user or based on the operations associated with block 58 of FIG. 3. For example, a memory of the local control system 44 may store a library of melodies having a plurality of tones that each correspond to an operation performed by the machine. At least in some instances, each of the tones may correspond to a particular component of the machine (e.g., an actuator). In any case, the local control system 44 may compare the received audio data to one or multiple of the melodies (e.g., reference audio tones). When the sound characteristics of the audio data do not correlate to or do not match the sound characteristics of the reference audio tones, the local control system 44 may determine that the audio data indicates an error corresponding to one of the operations not being performed. For example, the audio data may include eight tones and the reference audio tones may include nine tones, and thus the audio data is missing one audio tone of the nine tones corresponding the reference audio tones. As such, the local control system 44 may determine that the missing tone is associated with a malfunctioning software operation or mechanical component of the machine. At least in some instances, the local control system 44 may proceed to block 80 and output a notification to an operator that indicates the malfunctioning software operation or mechanical component. Additionally or alternatively, the process 70 may proceed to block 78 to adjust operation of the machine (e.g., the industrial automation equipment 47).

In some embodiments, the local control system 44 may utilize machine-learning algorithms to generate correlations between the received audio data and certain errors associated with machines. For example, the local control system 44 may correlate received audio data that is missing one or more audio tones with a particular component (e.g., an actuator) that is not operating as expected. In this way, the local control system 44 may generate inferences between audio data and errors that may aid operators in maintaining equipment of the industrial automation system.

At block 78, the processor may adjust operation of the equipment in a generally similar manner as described above with respect to block 64 of the method 50. As discussed above with respect to block 64 of process 50, the processor may output a notification to request a user to confirm whether or not to adjust the operation. If an adjustment is made, the process 70 may proceed to block 80. At block 80, the processor may send a notification to an administrator or an operator of the industrial automation system 10 indicating that the automation command is being implemented. In some embodiments, the notification may provide diagnostic information, a recommendation to remedy the situation, and/or provide instructions to fix the error in the equipment. In an embodiment, where the process 70 is being executed as part of maintenance of a machine, the notification may include instructions (e.g., a print out, an electronic file to display on a device of the user) that an operator may use to repair the machine.

As described above, an operator may utilize the audio tones to perform maintenance on machines or industrial automation equipment 47 of the industrial automation system. Referring now to FIG. 5, FIG. 5 is a flowchart of a method 90 for performing maintenance on industrial automation equipment 47 of the industrial automation system 10 based on detected audio data corresponding to sounds produced by the audio device 40. Although the method 90 is described below as performed by the local control system 44, it should be noted that the method 90 may be performed by any suitable processor to perform automation commands based on detected audio data. Moreover, although the following description of the method 90 is described in a particular order, it should be noted that the method 90 may be performed in any suitable order and with certain steps removed added and/or remove.

At block 92, the local control system 44 may receive a maintenance operation instruction. In general, the maintenance operation instruction is an input that indicates maintenance is to be performed on the industrial automation equipment 47. In some embodiments, the maintenance operation instruction may be provided by a user via the HMI 32. In some embodiments, the local control system 44 may receive the maintenance operation instruction when the local control system 44 determines an error in received audio data, as generally described in block 62 of FIG. 2. In some embodiments, the local control system 44 may modify the sound produced by the audio devices 40 upon receiving the maintenance operation instruction or otherwise receiving an input indicating that an individual may be performing maintenances on the industrial automation equipment 47. For example, the local control system 44 may modify the sound by reducing the volume, changing the melody to be played (i.e., the audio devices may play a melody indicating that the industrial automation equipment 47 is receiving maintenance), or otherwise distinguish the sound played by the audio device 40 during maintenance from the sound played by the audio device 40 during operation of the industrial automation equipment 47. As another non-limiting example, the audio device 40 may output a particular sound indicating whether the battery of a machine is below a threshold.

Upon receiving the maintenance operation instruction at block 92, the local control system 44 may detect audio produced by the audio device 40. For example, the local control system 44, in response to receiving the maintenance operation instruction, may output a control signal that causes the industrial automation equipment 47 to perform a test of the software (e.g., software components) on the industrial automation equipment 47. During the test, the industrial automation equipment 47 may execute the software components linked to respective audio tones and audio device 40 may produce a sound (e.g., a melody) corresponding to the audio tone linked subroutines of the software that indicate whether the software is operating as expected. As another non-limiting example, the local control system 44 may access previously generated audio data from a previous operation of a machine. That is, during a previous operation of the machine, the audio sensors 42 may acquire audio data that includes sounds corresponding to the audio tone linked to the different operations performed by the machines. The generated audio data from the previous operation may be stored and accessed by the local control system 44 to determine whether the machine operated as expected. It should be recognized that the stored audio data may function as a record of operations of the equipment, and may be used to diagnose operation failures of the industrial automation equipment.

At block 96, the local control system 44 may determine if the detected audio received at block 94 is different from the expected noise profile associated with the industrial automation equipment 47. As discussed herein, the industrial automation equipment 47 may have audio tones that are linked to the operations performed by components of the industrial automation equipment 47, and the audio tones may produce a melody that is recognizable to an individual or the local control system 44. As such, the local control system 44 may compare the detected audio to reference audio tones associated with the industrial automation equipment 47 to determine if the sounds produced by the audio device 40 match the reference audio tones. In some embodiments, the local control system 44 may use a threshold to determine if the detected audio data and the reference audio tones are different enough to correlate to a machinery issue. For example, if the detected audio data deviates from the reference audio tones, to the point where the deviation exceeds a threshold, the local control system 44 may determine that the detected audio data is different from the reference audio tones.

If the local control system 44 determines the detected audio data is not different from the reference audio tones, the local control system 44, at block 92, may receive additional detected audio data to continue to monitor operation of the industrial automation equipment 47. The detected audio data not substantially deviating from the reference audio tones may indicate that the industrial automation equipment 47 is operating as expected, or that the audio device 40 is not emitting abnormal or unexpected noises corresponding to an error in the operation of the industrial automation equipment, beyond a tolerable threshold.

However, if the local control system 44 determines that the detected audio data is different from the reference audio tones, the local control system 44, at block 98, may send a notification that indicates a machinery issue is present based on the detected audio data received at block 92. The detected audio data may deviate from the reference audio tones in such a way to suggest or correlate to a machinery issue of the industrial automation equipment 47. For example, as described herein, the audio tones may be linked to the operations performed by components of the industrial automation equipment 47. As such, if the received audio data is missing one or more audio tones or the audio tones otherwise deviate from the reference audio tones based on sound characteristics (e.g., volume, pitch, frequency, rhythm) that may suggest that the components (e.g., software components and hardware components) associated with the one or more missing audio tones are not operating as expected. Moreover, the one or more audio tones may be distinct (e.g., having different sound characteristics) than machine noise produced by the industrial automation equipment 47 or other machines operating nearby, and thus the one or more audio tones may be more readily identified. At least in some instances, a discrepancy between the received audio data and the referenced audio tones may indicate a location (e.g., one or more industrial automation equipment that are not operating as expected) and a nature of the error or completed action. Accordingly, the notification may indicate which machines or software files are not operating accordingly. In addition, in some embodiments, the local control system 44 also analyzes secondary input (e.g., data associated with a voltage or current spike event, power output or generation data, data associated with a power surge event) when the reference audio tones deviation occurs. In this way, the local control system 44 may diagnose machinery issues (e.g., identify a probable cause) of the industrial automation equipment 47 based on the detected audio data and/or the secondary input. In some embodiments, the local control system 44 may store the detected audio data as reference audio data to use for future identifications of errors, as generally described in block 76 of FIG. 4.

Accordingly, the present disclosure relates to an industrial control system that generates audio tones for operations performed by industrial automation equipment. Each of the audio tones may be linked to the operations performed by the industrial automation equipment and used to produce a melody (e.g., an audio melody) that indicates whether the industrial automation equipment is operating as expected. In some embodiments, the deviations or changes in the melody from the generated melody may indicate which components of the industrial automation equipment as not operating as expected. In this way, an individual may not need to visually inspect the industrial automation equipment or access software associated with the industrial automation equipment to identify an error or verify that the industrial automation equipment is operating as expected.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
one or more audio devices configured to output sound waves; and
a control system comprising a processor, wherein the control system is configured to:
receive a first sensor dataset indicative of a plurality of operations performed by a plurality of components in an industrial automation system from one or more sensors;
determine a sequence of the plurality of operations performed by the plurality of the components in the industrial automation system based on the first sensor dataset;
determine a plurality of audio tones based on the sequence of the plurality of operations;
detect, subsequent to receiving the first sensor dataset, a second sensor dataset indicative of the sequence of the plurality of operations performed by the plurality of components; and
send one or more control signals to the one or more audio devices in response to detecting the second sensor dataset wherein the one or more audio devices are configured to produce the plurality of audio tones in accordance with the sequence in response to receiving the one or more control signals.

2. The system of claim 1, wherein the first sensor dataset, the second sensor dataset, or both is associated with power consumption data, temperature data, electrical data, control signals, or any combination thereof.

3. The system of claim 1, wherein the control system is configured to:
identify an audio data profile based on the first sensor dataset, wherein the audio data profile comprises the plurality of audio tones; and
assign one of the plurality of audio tones to one operation of the plurality of operations.

4. The system of claim 3, wherein the control system is configured to identify the audio data profile by:
determining a number of operations of the plurality of operations performed by the plurality of components based on the first sensor dataset; and
identifying the audio data profile from a plurality of audio data profiles based on the number of operations.

5. The system of claim 1, wherein the control system is configured to:
receive a third sensor dataset from the one or more sensors, wherein the third sensor dataset is indicative of a fewer number of operations performed by the plurality of components as compared to the plurality of operations;
send one or more additional control signals to the one or more audio devices in response to detecting the third sensor dataset, wherein the one or more audio devices are configured to produce an additional plurality of audio tones in response to receiving the one or more additional control signals.

6. The system of claim 5, wherein the control system is configured to:
determine an error in the third sensor dataset based on the additional plurality of audio tones; and
adjust one or more operations of at least one of the plurality of components in response to determining the error.

7. A method, comprising:
receiving, via a processor, a first plurality of audio tones associated with a plurality of operations of one or more components in an industrial system;
determining, via the processor, a first sequence of the first plurality of audio tones associated with the plurality of operations of one or more components in the industrial system;
retrieving, via the processor, a melody comprising a second sequence of a second plurality of audio tones;
detecting, via the processor, a discrepancy between the first sequence of the first plurality of audio tones and the second sequence of the second plurality of audio tones;
identifying, via the processor, an operation of the plurality of operations based on the discrepancy; and
outputting, via the processor, a control signal to actuate one or more operations of the one or more components based on the operation of the plurality of operations.

8. The method of claim 7, comprising outputting a notification to a user device indicative of the operation of the plurality of operations.

9. The method of claim 7, wherein the operation of the plurality of operations corresponds to a software operation performed by one or more software components.

10. The method of claim 7, wherein the operation of the plurality of operations corresponds to a physical operation performed by one or more hardware components.

11. The method of claim 7, wherein detecting the discrepancy between the first plurality of audio tones and the melody comprises determining that at least one audio tone of the first plurality of audio tones is missing based on a plurality of reference audio tones associated with the melody.

12. The method of claim 11, wherein the at least one audio tone of the first plurality of audio tones corresponds to at least one component of the one or more components.

13. The method of claim 7, wherein detecting the discrepancy between the first plurality of audio tones and the melody comprises determining that one or more sound characteristics of an audio tone of the first plurality of audio tones does not match one or more reference sound characteristics of a corresponding audio tone in a plurality of reference audio tones associated with the melody.

14. The method of claim 7, wherein the first plurality of audio tones corresponds digital audio.

15. The method of claim 7, wherein the second sequence of the second plurality of audio tones is distinct from machine noise associated with the one or more components in the industrial system.

16. A non-transitory computer-readable medium comprising computer-executable instructions that, when executed by at least one processor, are configured to cause the at least one processor to:
   receive a first plurality of audio tones associated with a plurality of operations of one or more components in an industrial system;
   determine a first sequence of the first plurality of audio tones associated with the plurality of operations of one or more components in the industrial system;
   retrieve a melody comprising a second sequence of a second plurality of audio tones;
   detect a discrepancy between the first sequence of the first plurality of audio tones and the second sequence of the second plurality of audio tones;
   identify at least one component of the one or more components that corresponds to the discrepancy, wherein the discrepancy is based on a time period between each adjacent audio tone of the second plurality of audio tones; and
   transmit a notification to a computing device indicative of a possible error in the component based on the identified at least one component.

17. The non-transitory computer-readable medium of claim 16, wherein the audio tone comprises a music note.

18. The non-transitory computer-readable medium of claim 16, wherein the notification comprises one or more maintenance instructions associated with the at least one component.

19. The non-transitory computer-readable medium of claim 16, wherein the computer-executable instructions that are configured to cause the at least one processor to:
   receive an indication of a maintenance operation being performed on the industrial system; and
   send a control signal to one or more audio devices to modify an output of the first plurality of audio tones.

20. The non-transitory computer-readable medium of claim 16, wherein the computer-executable instructions are configured to cause the at least one processor to adjust an operation of the at least one component based on the possible error.

* * * * *